United States Patent
Kato

(10) Patent No.: US 7,525,592 B2
(45) Date of Patent: Apr. 28, 2009

(54) IMAGE CAPTURE DEVICE WITH AUTOMATIC ADJUSTING FUNCTION FOR SENSITIVITY

(75) Inventor: Yoshiyuki Kato, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 711 days.

(21) Appl. No.: 11/035,268

(22) Filed: Jan. 12, 2005

(65) Prior Publication Data

US 2005/0157206 A1 Jul. 21, 2005

(30) Foreign Application Priority Data

Jan. 16, 2004 (JP) ............................. 2004-008905

(51) Int. Cl.
*H04N 5/222* (2006.01)

(52) U.S. Cl. .................... 348/370; 348/229.1; 348/296; 348/348; 348/364

(58) Field of Classification Search ................. 348/370, 348/296, 364, 229.1, 362; 396/77
See application file for complete search history.

(56) References Cited

U.S. PATENT DOCUMENTS

| | | | | |
|---|---|---|---|---|
| 4,549,801 | A * | 10/1985 | Winter | 396/106 |
| 4,962,521 | A * | 10/1990 | Komatsu et al. | 348/14.14 |
| 5,218,397 | A * | 6/1993 | Takagi | 396/157 |
| 5,438,367 | A * | 8/1995 | Yamamoto et al. | 348/371 |
| 5,517,243 | A * | 5/1996 | Kudo et al. | 348/296 |
| 5,848,304 | A * | 12/1998 | Ikemura | 396/77 |
| 5,950,023 | A * | 9/1999 | Hara et al. | 396/158 |
| 6,654,062 | B1 * | 11/2003 | Numata et al. | 348/362 |
| 6,700,619 | B1 * | 3/2004 | Hamamura | 348/370 |
| 6,744,471 | B1 * | 6/2004 | Kakinuma et al. | 348/371 |
| 7,180,541 | B2 * | 2/2007 | Kinjo | 348/239 |
| 7,242,426 | B2 * | 7/2007 | Miyashita et al. | 348/229.1 |
| 7,327,391 | B2 * | 2/2008 | Fujino | 348/230.1 |
| 2001/0004271 | A1 | 6/2001 | Konishi | |
| 2002/0018142 | A1 | 2/2002 | Oda | |
| 2003/0117519 | A1 * | 6/2003 | Wakabayashi | 348/364 |
| 2003/0169365 | A1 | 9/2003 | Tojo | |
| 2004/0008274 | A1 * | 1/2004 | Ikari et al. | 348/370 |
| 2004/0075762 | A1 * | 4/2004 | Okubo | 348/371 |
| 2004/0135923 | A1 * | 7/2004 | Kato | 348/371 |

FOREIGN PATENT DOCUMENTS

| | | | |
|---|---|---|---|
| JP | 2000-134533 A | 5/2000 |
| JP | 2001-230970 A | 8/2001 |
| JP | 2001-285707 A | 10/2001 |

* cited by examiner

*Primary Examiner*—Tuan V Ho
*Assistant Examiner*—Kent Wang
(74) *Attorney, Agent, or Firm*—Frishauf, Holtz, Goodman & Chick, P.C.

(57) ABSTRACT

An image capture device includes a light source, an image capture unit, a brightness detector, an object distance obtaining unit which obtains an object distance to the object, first and second controllers, and an amplifier which amplifies an image signal output from the image capture unit by an amplifying factor according to a sensitivity set by one of the first and second controllers. The first controller disables the light source and sets a sensitivity which is in accordance with the brightness of the object and which is lower than a predetermined sensitivity. The second controller enables the light source and sets a sensitivity which is lower than the predetermined sensitivity. The second controller includes a sensitivity obtaining unit which obtains a sensitivity according to the object distance and a maximum amount of light emitted from the light source, and a setting unit which sets the obtained sensitivity.

23 Claims, 6 Drawing Sheets

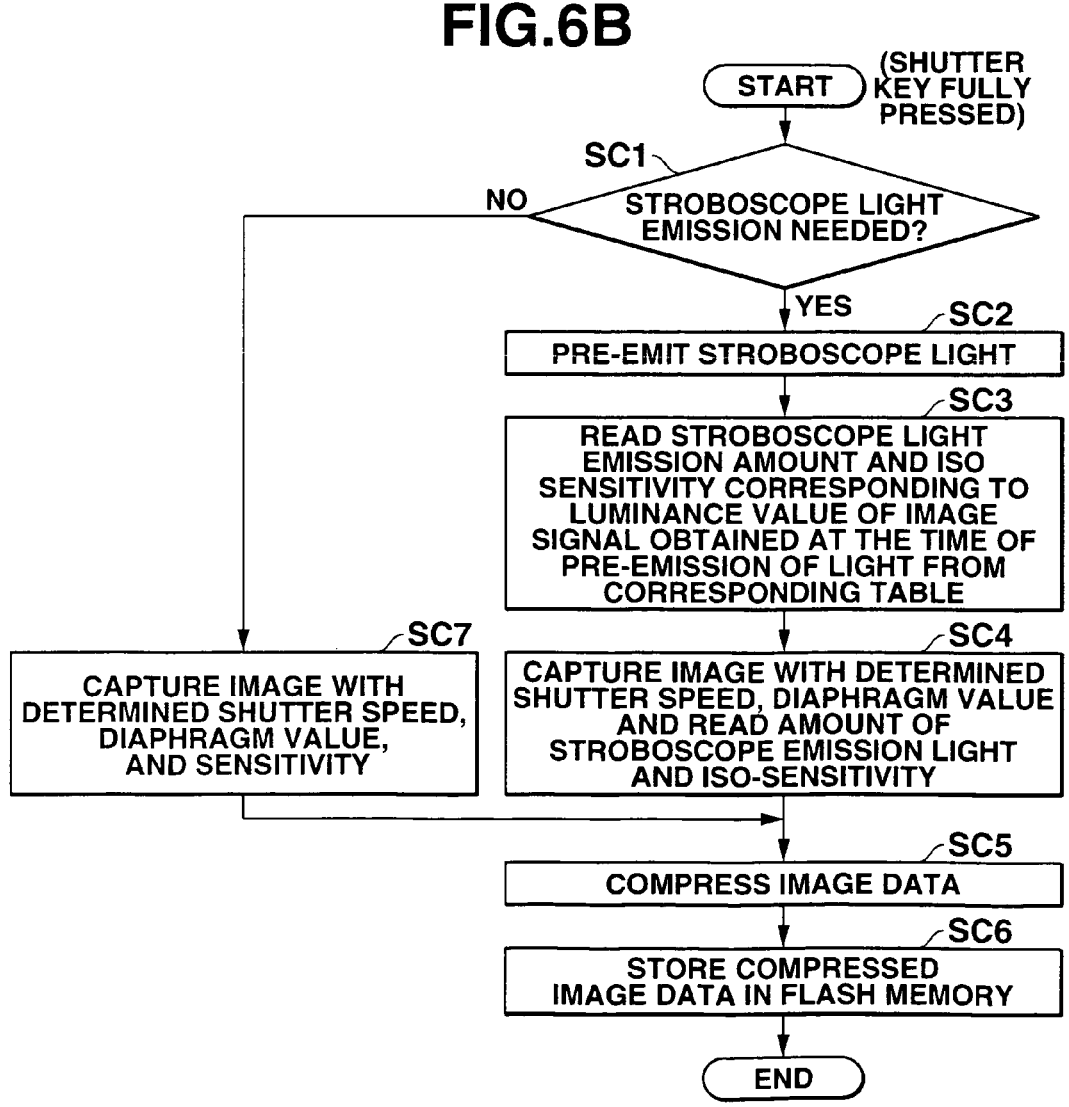

IMAGE CAPTURE DEVICE WITH AUTOMATIC ADJUSTING FUNCTION FOR SENSITIVITY

CROSS-REFERENCE TO RELATED APPLICATIONS

This application is based upon and claims the benefit of priority from prior Japanese Patent Application No. 2004-008905, filed Jan. 16, 2004, the entire contents of which are incorporated herein by reference.

BACKGROUND OF THE INVENTION

1. Field of the Invention

The present invention relates to an image capture device to be used for a digital camera comprising, for example, an ISO sensitivity automatic adjusting function, and a sensitivity setting method therefor.

2. Description of the Related Art

Conventionally, a digital camera comprising a stroboscope image capturing function is known. If a shutter key is half pressed, the digital camera calculates a distance to an object, and calculates and sets an amplifying factor (ISO sensitivity) of an AGC amplifier and a light measuring value of a stroboscope device based on the calculated distance. Then, if the shutter key is fully pressed, the stroboscope emits a light beam for the time according to the above-mentioned light measuring value as well as an image signal output from a CCD is amplified by the above-mentioned amplifying factor for recording the obtained image data.

BRIEF SUMMARY OF THE INVENTION

The present invention has been achieved in view of the above-mentioned conventional problem, and an object thereof is to provide an image capture device capable of image capturing an object with an adequate brightness while reducing influence on a battery life as much as possible, and a sensitivity setting method therefor.

According to an embodiment of the present invention, an image capture device comprises:

a light source which emits light;

an image capture unit which outputs an image signal;

a brightness detector which detecting a brightness of an object;

a first controller which disables the light source and sets a sensitivity which is in accordance with the brightness of the object detected by the brightness detector and which is lower than a predetermined sensitivity;

a second controller which enables the light source and sets a sensitivity which is lower than the predetermined sensitivity; and an amplifier which amplifies the image signal output form the image capture unit by an amplifying factor according to the sensitivity set by one of the first and second controllers.

According to another embodiment of the present invention, a sensitivity setting method for an image capture device which causes a light source to operate according to a brightness of an object and amplifies an image signal by an amplifying factor according to the set sensitivity, the method comprises:

disabling the light source, setting a sensitivity which is in accordance with the brightness of the object detected by a detector and which is lower than a predetermined sensitivity; and enabling the light source and setting a sensitivity which is lower than the predetermined sensitivity.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 6A is a correspondence table of a brightness of the object (luminance value of an image signal), and the ISO sensitivity and an amount of stroboscope emission light at the time of the pre-emission of light; and FIG. 6B is a flow chart showing a modified embodiment of the process procedure at the time of half pressing the shutter key.

DETAILED DESCRIPTION OF THE INVENTION

Figure 1:
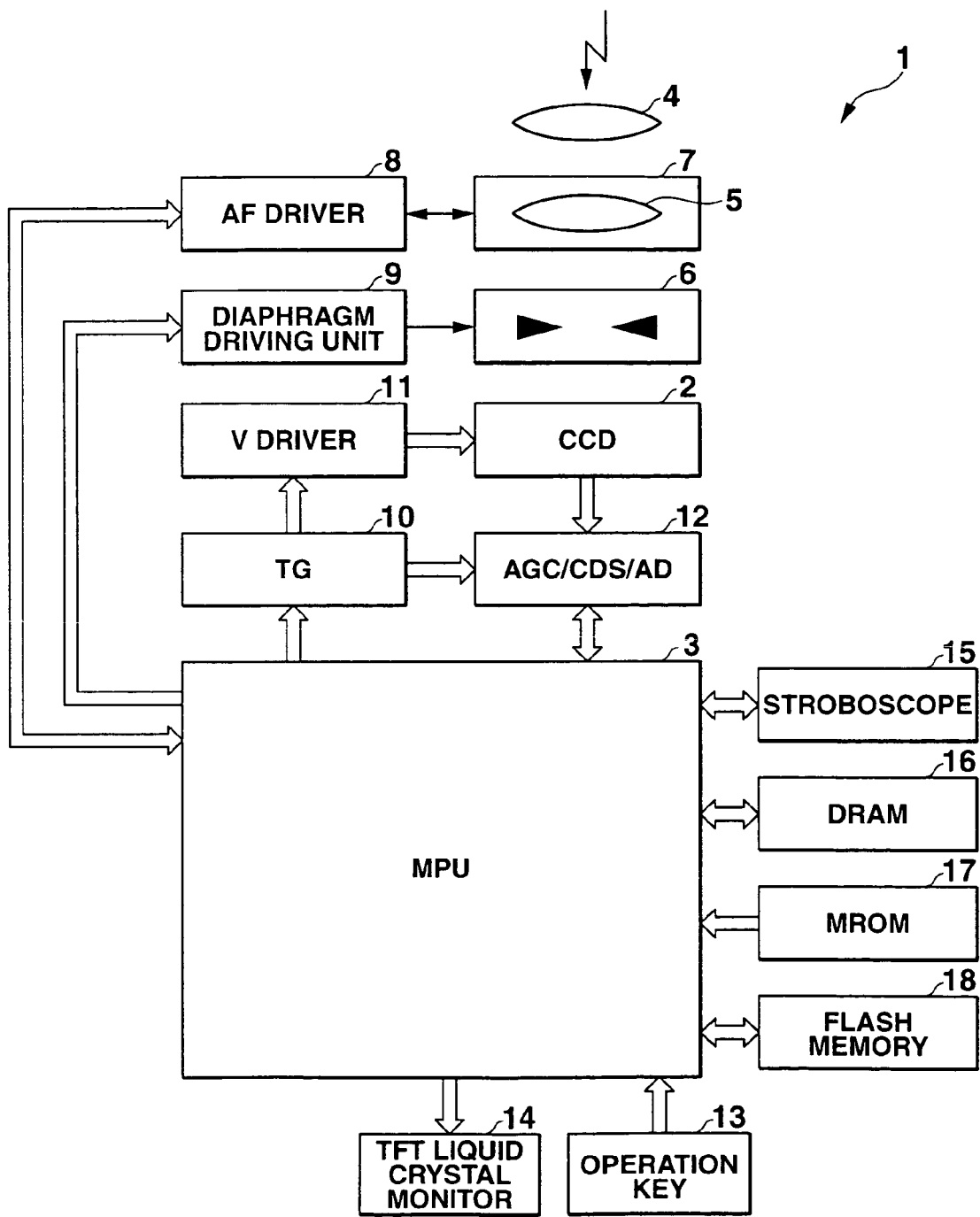
FIG. 1 is a block diagram schematically showing a configuration of a digital camera according to an embodiment of the present invention.

An embodiment of an image capture device according to the present invention will now be described with reference to the accompanying drawings. FIG. 1 is a block diagram schematically showing a configuration of a digital camera 1 according to an embodiment of the present invention. The digital camera 1 mainly comprises a CCD 2 as image capture means, and an MPU 3. The MPU 3 has an image processing function of compressing and decompressing an image captured by the CCD 2 and producing and reproducing an image file of a format corresponding to a predetermined format, such as a universal standard DCF (design rule for camera file system) and a JPEG (joint photographic expert group). An optical image of an object is focused onto a light receiving surface of the CCD 2 through an image capture lens 4, a focus lens 5 and a diaphragm 6. The focus lens 5 is supported by a driving mechanism 7 comprising an AF motor and the like, and executes a focusing operation of reciprocally moving on the optical axis by supplying a driving signal output from an AF driver 8 to the driving mechanism 7 by a control signal from the MPU 3. The diaphragm 6 is driven by a driving signal generated by a diaphragm driving unit 9 based on the control signal from the MPU 3 so as to adjust an amount of the light of the object image to be incident on the CCD 2.

Moreover, the MPU 3 is connected with a TG (timing generator) 10 for generating a timing signal such that the CCD 2 is driven by a V driver 11 (vertical direction driver) based on the timing signal generated by the TG 10 so as to thereby output an analog image signal according to the luminance of the object image from the CCD 2 and send the same to a unit circuit 12. The unit circuit 12 comprises a CDS (correlation double sampler) for storing an image signal output from the CCD 2, au automatic gain controller (AGC) as an analog amplifier to which the image signal is supplied from the CDS, and an A/D converter (AD) for converting the analog image signal amplified and adjusted by the AGC into a digital signal, and the output signal of the CCD 2 is sampled according to the black level so as to be sent to the MPU 3 as the digital signal. The AGC amplifies the image signal to be supplied from the CDS by the amplifying factor according to an ISO sensitivity to be described later.

The MPU 3 is connected with an operation key unit 13 comprising various key groups including a shutter key, a TFT liquid crystal monitor 14, a stroboscope 15, a DRAM 16, an MROM (mask ROM) 17, and a flash memory 18. The stroboscope 15 emits the light of which amount is controlled by the MPU 3.

The DRAM 16 is an operation memory and the flash memory 18 is an image recording memory. The digital signal (image signal) output from the CCD 2 to the MPU 3 is stored temporarily in the DRAM 16 so as to be recorded in the flash memory 18 finally as the compressed image data after the MPU 3 has executed various image processes. The flash memory 18 may be of a card type detachable on the camera main body.

The image data recorded in the flash memory 18 are read out to the MPU 3 as needed. They are converted to a digital video signal or an analog video signal via a process such as a decompressing process, addition of a luminance signal and a color signal, or the like so as to be displayed by the TFT liquid crystal monitor 14. Moreover, an image periodically captured in the recording mode is displayed on the TFT liquid crystal monitor 14 as a through image.

Figure 2:
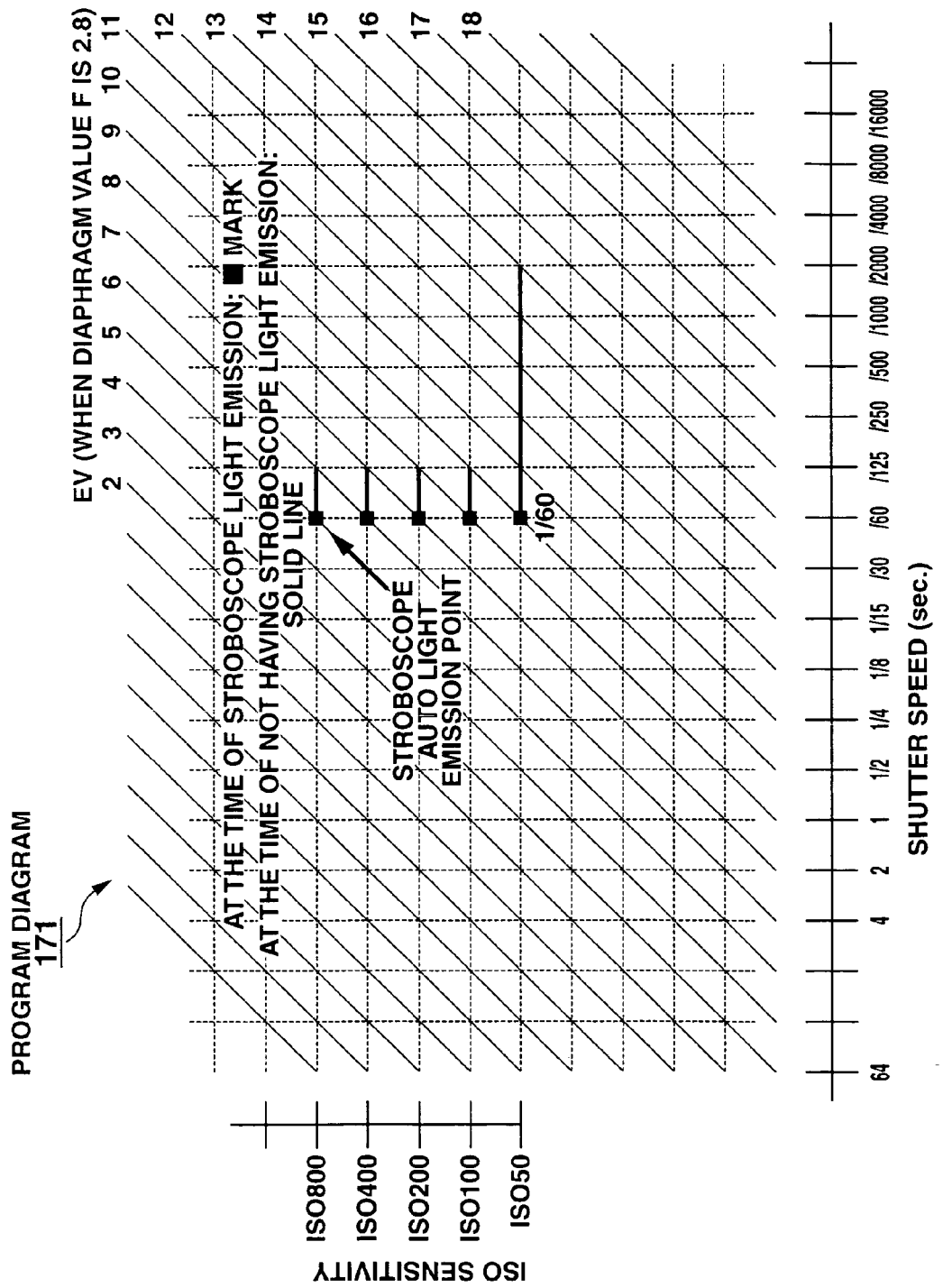
FIG. 2 is a program diagram.

The MROM 17 is a program ROM for recording various kinds of operation programs needed for the control and the data process of each unit in the MPU 3. That is, the MROM 17 stores various kinds of data such as a program diagram 171 showing a combination of an ISO sensitivity and a shutter speed corresponding to an appropriate exposure value (EV) (if the diaphragm value F is 2.8) at the time of image capturing shown in FIG. 2 together with the above-mentioned programs. In the program linear diagram 171, "■" denotes a stroboscope automatic light emission point for automatically emitting a light beam from the stroboscope 15.

The MPU 3 carries out the AE control by a charge accumulation time of the CCD 2 as the shutter speed, an opening degree of the diaphragm 6 and a gain control of the AGC of the unit circuit 12 according to the above-mentioned program diagram as well as it carries out the AF (auto focus) control for driving the focus lens 5 according to a predetermined program and the AWB (auto white balance) control. Further, if the shutter key is operated (at the time of image capturing), as needed, it controls the light emission of an image capture auxiliary light beam by the stroboscope 15 and an amount of emission light. The captured image data is recorded in the flash memory 18.

A power source needed for each unit is supplied from a battery (not shown).

Next, an operation in a case of a half pressing operation of the shutter key at the time of image capturing by the digital camera 1 having the above-mentioned configuration will be explained with reference to the flow chart of FIG. 3. That is, in the case of the half pressing operation of the shutter key, the MPU 3 starts the operation based on the above programs so as to measure a brightness of the object based on the through image (step S1). Next, an object distance D-af (m) as a distance to the object is obtained (step S2). At step S2, the focus control of the focus lens 5 is executed by a known contrast AF method so as to obtain the object distance D-af using a focus setting table stored in the MROM 17 from the zoom ratio of the image capture lens 4 and the position of the focus lens 5 at the time, or distance information set by the mode of a manual focus, a macro mode, or the like is provided as the object distance D-af.

Subsequently, based on the program diagram 171, the processes of step S3 to step S7 are executed. That is, based on the exposure value EV corresponding to the brightness of the object, the value being calculated in the above-mentioned step S1, it is determined whether or not the shutter speed set by the lowest ISO sensitivity (ISO 50) on the program diagram 171 is slower than 1/60 (step S3). Here, the shutter speed 1/60 is the limit value of the slowest shutter speed capable of restraining the occurrence of blurring of images due to camera shake. Then, if the shutter speed set by the lowest ISO sensitivity is not slower than 1/60 (step S3; NO), the shutter speed, the diaphragm and the sensitivity of the image capturing setting are set (step S4).

However, if the shutter speed is slower than 1/60, it is determined whether or not the ISO sensitivity of the image capturing setting is the maximum value (ISO 800 in this embodiment) (step S5). If it is not the maximum value, with the ISO sensitivity raised by one grade (step S6), determination in the above-mentioned step S3 is executed again. If the shutter speed becomes not slower than 1/60 (step S3; NO), the shutter speed, the diaphragm and the sensitivity of the image capturing setting are set (step S4). However, if the shutter speed is slower than 1/60 again, with the ISO sensitivity raised by one grade in the step S6 process if the determination in step S5 is NO, the shutter speed, the diaphragm and the sensitivity of the image capturing setting are set in step S4.

However, if the determination in step S5 becomes YES, that is, if the shutter speed is slower than 1/60 even if the ISO sensitivity is the maximum value (ISO800), a mode of stroboscope light emission is set to be the automatic light emission mode as well as the diaphragm and the sensitivity are set with the shutter speed 1/60 (step S7). At the time, as to the sensitivity, it is selected optionally from the ISO sensitivities 50, 100, 200, 400 and 800 and set.

Then, in step S8 subsequent to step S4 or step S7, it is determined whether or not the image capturing condition set by the above-mentioned image capturing setting includes a stroboscope light emission (step S8). That is, since the stroboscope light emission is not included in the image capturing condition in the case of the procedure from step S4 to step S8, the determination in step S8 is NO. Therefore, in this case, the process according to the flow at the time of half pressing the shutter key is finished. If the shutter key is fully pressed, the image data captured with the shutter speed (the charge accumulation time of the CCD 2), the diaphragm and the ISO sensitivity set in the above-mentioned step S4 without the stroboscope light emission is recorded in the flash memory 18. Accordingly, since the image capturing operation is executed without the stroboscope light emission, shortening of the battery life by the frequent use of the stroboscope light emission can be prevented.

On the other hand, in the case of the procedure from step S7 to step S8, since the stroboscope light emission is included in the image capturing condition, the determination in step S8 is YES. In this case, a stroboscope reaching distance D-ae is calculated by the below-mentioned equation (1) (step S9):

$$D\text{-}ae = \frac{GN}{F} \times \sqrt{\frac{ISO\text{-}capt}{100}} \qquad (1)$$

wherein GN is the maximum amount of light inherent to the digital camera (guide number), F is the diaphragm value and ISO-capt is the image capturing sensitivity (ISO sensitivity).

Next, it is determined whether or not D-ae>D-af (step S10). As a result of this determination, if D-ae>D-af (step S10; YES), since the stroboscope reaching distance D-ae (m) of the stroboscope in the ISO sensitivity (ISO-capt) is longer than the object distance D-af (m), it means that there is a possibility of clearly image capturing the object at the object distance D-af even if the ISO sensitivity (ISO-capt) is lowered. Therefore, in this case, with the setting sensitivity lowered by one grade, the ISO-capt substituted in the equation (1) is lowered by one grade (step S11). Next, using the ISO-capt lowered by one grade, that is, with the ISO-capt lowered by one grade substituted in the equation (1), the reaching distance D-ae is calculated (step S12).

Furthermore, it is determined whether or not the relationship between the reaching distance D-ae calculated by substituting the ISO-capt lowered by one grade in the equation (1) and the above-mentioned object distance D-af still satisfies the condition: D-ae>D-af (step S13). If it still satisfies the condition: D-ae>D-af, it is determined whether or not the ISO-capt substituted in the equation (1) reaches the lowest sensitivity (in this embodiment, ISO 50) (step S14). If it does not reach that, the processes from step S11 are repeated.

Then, in the case of repeating the processes of steps S11 to S14, at the time if the condition: D-ae>D-af at the setting sensitivity is not satisfied (step S13; NO), that is, at the time if the stroboscope reaching distance D-ae calculated by using the ISO-capt is not longer than the object distance D-af, in other words, at the time if the ISO-capt is not excessive, the process according to the flow at the time of half pressing the shutter key is finished. In addition, in the case of repeating the processes of steps S11 to S14, also in the case where the ISO-capt substituted in the equation (1) reaches at the lowest sensitivity (step S14; YES), since the ISO sensitivity cannot be further lowered, the process according to the flow at the time of half pressing the shutter key is finished.

On the other hand, if the condition: D-ae>D-af is not satisfied as a result of the determination in step S10 (step S10; NO), since the stroboscope reaching distance D-ae at the ISO sensitivity (ISO-capt) is shorter than the object distance D-af, it is necessary to increase the stroboscope reaching distance D-ae by raising the ISO sensitivity (ISO-capt). Therefore, it is determined whether or not the ISO-capt substituted in the equation (1) so as to be used for the calculation of the stroboscope reaching distance D-ae reaches the maximum sensitivity (in this embodiment, ISO 800) (step S15). If it does not reach that, with the ISO-capt to be substituted in the equation (1) raised by one grade (step S16), the processes from step S9 are repeated. If the condition: D-ae>D-af is not satisfied, the determination in step S10 becomes YES so as to proceed to the above-mentioned step S11.

However, if the ISO-capt substituted in the equation (1) so as to be used for the calculation of the stroboscope reaching distance D-ae reaches the maximum sensitivity without satisfying the condition: D-ae>D-af (step S10; NO and the step S15; YES), it means that the condition: D-ae>D-af cannot be satisfied even with the maximum amount of stroboscope light (GN) and the ISO-capt maximum sensitivity. Therefore, since the stroboscope light beam of the digital camera 1 cannot be reached to the object at the object distance D-af, the warning alert is provided on the TFT liquid crystal monitor 14 and the process according to the flow at the time of half pressing the shutter key is finished.

If the ISO-capt (ISO sensitivity) is determined with the stroboscope light emission set as the image capturing condition according to the shutter key half pressing operation as mentioned above, after setting the determined ISO-capt as the gain of the AGC of the unit circuit 12, with the pre-emission of light of the stroboscope 15 according to the shutter key fully pressing operation, the appropriate amount of stroboscope emission light is decided based on the brightness of the digital signal (image signal) sent to the MPU 3 by the image capturing at the time of the pre-emission of light. As a result, an amount of stroboscope emission light is decided according to the decided ISO-capt. Thereafter, using the decided ISO-capt and amount of stroboscope emission light, the image capturing operation is executed with the above-mentioned set shutter speed and diaphragm. Moreover, in the case of the condition without the stroboscope light emission (in the case of proceeding from step S4 to step S8), the image capturing operation is executed with the shutter speed, diaphragm and sensitivity set in step S4.

Figure 4:
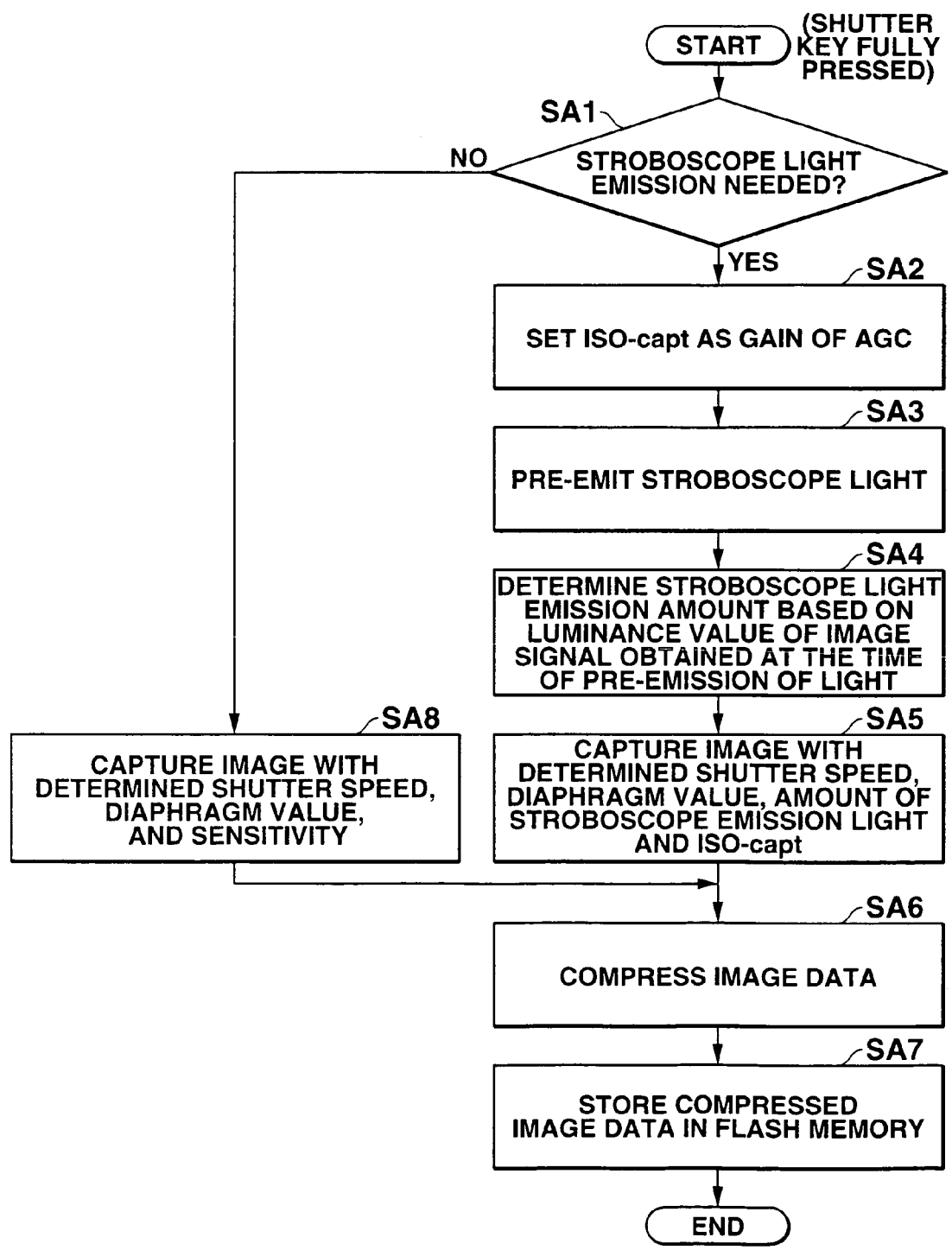
FIG. 4 is a flow chart showing a process procedure at the time of fully pressing the shutter key.

The flow chart at the time of fully pressing the shutter key is shown in FIG. 4.

At step SA1, it is determined whether or not the image capturing condition includes the stroboscope light emission. If the image capturing condition does not include the stroboscope light emission, an image is captured without stroboscope light emission and with the above shutter speed, diaphragm value, and ISO sensitivity set during the shutter key half pressing operation (step SA8).

If the image capturing condition includes the stroboscope light emission, ISO-capt is set as a gain of the AGC at step SA2. The stroboscope 15 pre-emits light at step SA3. An amount of light emission of the stroboscope 15 is determined based on the brightness of the image signal obtained at the time of pre-emission of light at step SA4. An image is captured with stroboscope light emission of which amount is determined at step SA4 and with the above shutter speed and diaphragm value set during the shutter key half pressing operation and ISO-capt (step SA5).

The captured image data is compressed (step SA6), and the compressed image data is recorded in the flash memory 18 (step SA7).

Figures 5A, 5B:
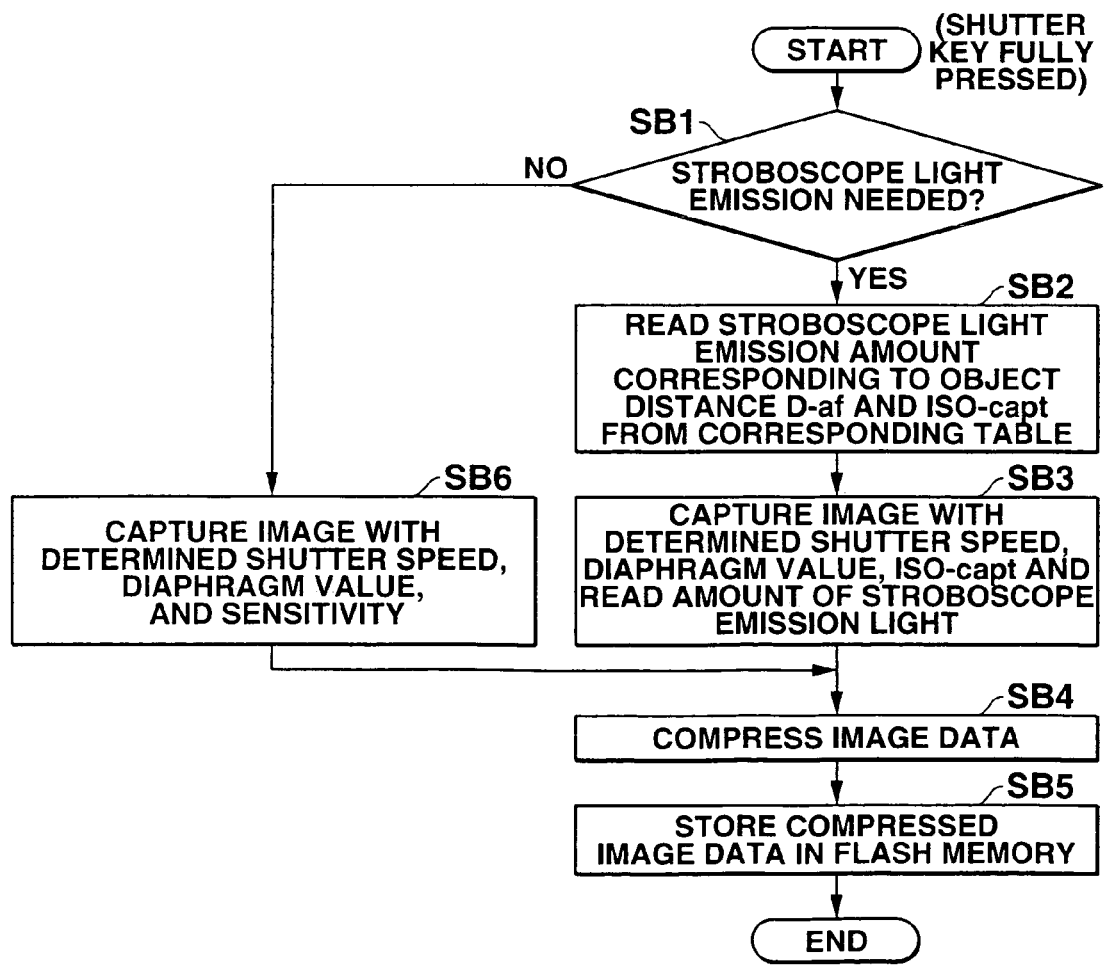
FIG. 5A is a correspondence table of an ISO sensitivity, an object distance, or the like and an amount of stroboscope emission light.
FIG. 5B is a flow chart showing a modified embodiment of the process procedure at the time of fully pressing the shutter key.

Of course, the appropriate ISO sensitivity is decided as mentioned above and the object distance is known. Accordingly, it is also possible to store in the MROM 17 the correspondence table of the ISO sensitivity, the object distance or the like and an amount of stroboscope emission light as shown in FIG. 5A, and read out an amount of stroboscope emission light corresponding to the ISO sensitivity and the object distance from the correspondence table so as to control an amount of light emitted from the stroboscope 15 at the time of image capturing without executing the pre-emission of light (see the flow chart of FIG. 5B).

At step SB1, it is determined whether or not the image capturing condition includes the stroboscope light emission. If the image capturing condition does not include the stroboscope light emission, an image is captured without stroboscope light emission and with the above shutter speed, diaphragm value, and ISO sensitivity set during the shutter key half pressing operation (step SB6).

If the image capturing condition includes the stroboscope light emission, an amount of stroboscope emission light corresponding to ISO-capt and the object distance D-af are read from the correspondence table (step SB2). An image is captured with stroboscope light emission of which amount is read at step SB2 and with the above shutter speed and diaphragm value set during the shutter key half pressing operation and ISO-capt (step SB3).

The captured image data is compressed (step SB4), and the compressed image data is recorded in the flash memory 18 (step SB5).

Moreover, in this case, it is also possible to store the calculation formula instead of storing the correspondence table and calculate an amount of stroboscope emission light based on the ISO sensitivity and the object distance by using the calculation formula.

Although the ISO sensitivity is decided by the comparison of the stroboscope maximum reaching distance and the object distance in this embodiment, it is also possible to decide an amount of stroboscope emission light and the ISO sensitivity based on the brightness (an amount of light) of the object obtained by executing the pre-emission of light. For example, it is also possible to store in the MROM 17 the correspondence table of the object brightness (luminance value of the image signal) at the time of the pre-emission of light, the ISO sensitivity, and an amount of stroboscope emission light as shown in FIG. 6A, and read out the ISO sensitivity and an amount of stroboscope emission light corresponding to the luminance level of the image signal obtained at the time of the pre-emission of light so as to control the amplifying factor of the image signal (ISO sensitivity) at the time of image capturing and an amount of light emitted from the stroboscope 15 (see the flow chart of FIG. 6B).

At step SC1, it is determined whether or not the image capturing condition includes the stroboscope light emission. If the image capturing condition does not include the stroboscope light emission, an image is captured without stroboscope light emission and with the above shutter speed, diaphragm value, and ISO sensitivity set during the shutter key half pressing operation (step SC7).

If the image capturing condition includes the stroboscope light emission, the stroboscope 15 pre-emits light at step SC2. An amount of light emission of the stroboscope 15 and ISO sensitivity corresponding to the brightness of the image signal obtained at the time of pre-emission of light are read out from the correspondence table (step SC3). An image is captured with stroboscope light emission of which amount is read at step SC3 and with the above shutter speed and diaphragm value set during the shutter key half pressing operation and ISO-capt (step SC4).

The captured image data is compressed (step SC5), and the compressed image data is recorded in the flash memory 18 (step SC6).

Further, it is also possible to store in the MROM 17 the ISO sensitivity, on or off of the stroboscope light emission, and an amount of stroboscope emission light (only in the case of the stroboscope light emission is on) corresponding to the object brightness (luminance value of the image signal), and read out the ISO sensitivity value, on or off of the stroboscope light emission, and an amount of stroboscope emission light corresponding to the measured object brightness so as to execute the image capturing process based on the readout information.

Figure 3:
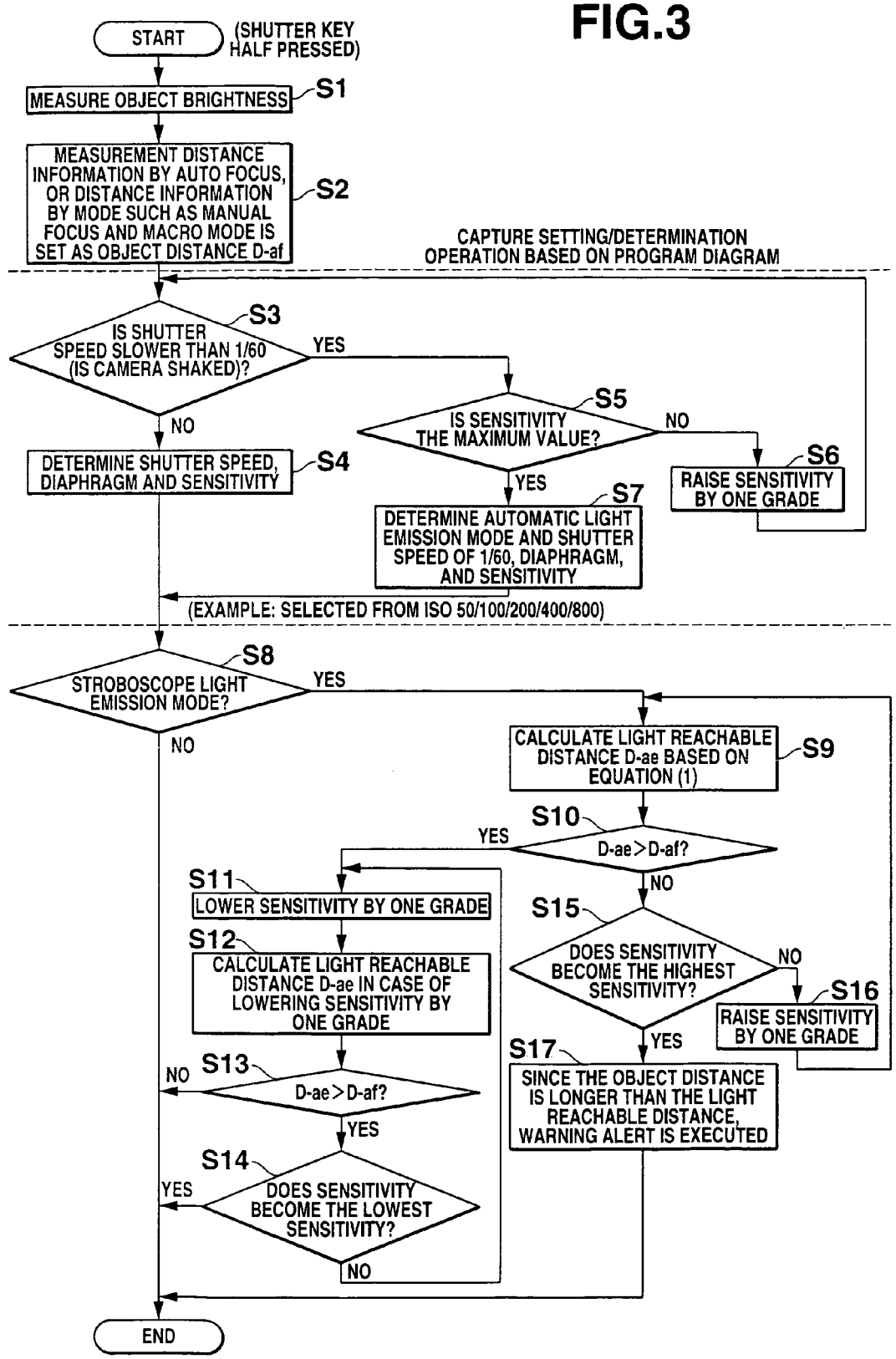
FIG. 3 is a flow chart showing a process procedure at the time of half pressing a shutter key.

Moreover, although the object brightness is calculated based on the through image in step S1 of FIG. 3, it is also possible to provide an optical sensor and obtain the object brightness by correcting as needed the brightness detected by the optical sensor.

In addition, although the object distance D-af is calculated by using the focus setting table by the contrast AF method in step S2 of FIG. 3, it is also possible to provide a distance measuring sensor such as an external phase difference sensor and obtain the object distance D-af by the detection value of the distance measuring sensor.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means. Furthermore, although the case of applying the present invention in the digital camera 1 as a dedicated machine has been explained in this embodiment, it is not limited thereto, and the present invention can also be applied in a camera stored in a portable information terminal such as a portable phone.

What is claimed is:

1. An image capture device comprising:
a light source which emits light;
an image capture unit which outputs an image signal;
a brightness detector which detects a brightness of an object;
a first controller which disables the light source and sets a sensitivity which is in accordance with the brightness of the object detected by the brightness detector and which is lower than a predetermined sensitivity;
a second controller which enables the light source and sets a sensitivity which is lower than the predetermined sensitivity;
an amplifier which amplifies the image signal output from the image capture unit by an amplifying factor according to the sensitivity set by one of the first and second controllers; and
an object distance obtaining unit which obtains an object distance to the object,
wherein the second controller comprises:
a sensitivity obtaining unit which obtains a sensitivity according to the object distance and a maximum amount of light emitted from the light source; and
a setting unit which sets the obtained sensitivity.

2. The image capture device according to claim 1, further comprising:
a selector which selects one of the first and second controllers based on the brightness of the object detected by the brightness detector.

3. The image capture device according to claim 1, further comprising:
a determining unit which determines whether or not an image signal having an appropriate brightness is obtained by the first controller; and a selector which selects one of the first and second controllers based on a result of the determination by the determining unit.

4. The image capture device according to claim 1, wherein the first controller sets the predetermined sensitivity and the predetermined sensitivity is a maximum sensitivity which is settable by the first controller.

5. The image capture device according to claim 1, further comprising:
a shutter key which instructs an image capture when the shutter key is pressed fully,
wherein the object distance obtaining unit obtains the object distance when the shutter key is pressed halfway, and the sensitivity obtaining unit obtains the sensitivity when the shutter key is pressed halfway.

6. The image capture device according to claim 1, further comprising:
an auto-focus unit which searches for a focusing position by moving a focus lens in an optical axis direction,
wherein the object distance obtaining unit obtains the object distance based on the focusing position searched for by the auto-focus unit.

7. The image capture device according to claim 1, wherein said sensitivity obtaining unit obtains the sensitivity based on the object distance using a relation among light reachable distances of the light source, the maximum amount of light emitted from the light source, and the sensitivity so that the object distance approximates the light reachable distance.

8. The image capture device according to claim 7, wherein the light reachable distance is obtained based on the maximum amount of light emitted from the light source and the predetermined sensitivity, and
wherein the image capture device further comprises an alarm unit which notifies that light cannot reach the object when the object distance is longer that the light reachable distance.

9. The image capture device according to claim 1, wherein the brightness detector detects the brightness of the object based on a brightness of the image signal output from the image capture unit.

10. The image capture device according to claim 1, wherein the second controller further comprises a setting unit which sets the predetermined sensitivity.

11. The image capture device according to claim 1, wherein the second controller further comprises:
a pre-emission unit which causes the light source to pre-emit light; and
a light emission amount determining unit which determines a light emission amount of the light source based on a brightness of an image signal which is output from the image capture unit at the time of pre-emission of light by the pre-emission unit and which is amplified by the amplifier by the amplifying factor according to a sensitivity lower than the predetermined sensitivity, and
wherein the second controller causes the light source to emit the amount of light determined by the light emission amount determining unit.

12. The image capture device according to claim 11, further comprising:
a shutter key,
wherein the pre-emission unit causes the light source to pre-emit light upon a pressing of the shutter key, and the light emission amount determining unit determines the light emission amount of the light source upon the pressing of the shutter key.

13. The image capture device according to claim 1, wherein the second controller further comprises a determining unit which determines a light emission amount of the light source based on the object distance and a sensitivity lower than the predetermined sensitivity, and wherein the second controller causes the light source to emit the amount of light determined by the light emission amount determining unit.

14. The image capture device according to claim 1, further comprising:
a shutter speed controller which sets a shutter speed which is in accordance with the brightness of the object detected by the brightness detector and which is slower than a predetermined shutter speed.

15. The image capture device according to claim 14, further comprising:
a determining unit which determines whether or not an image signal having an appropriate brightness is obtained by the shutter speed controller,
wherein, when the determining unit determines that the image signal having an appropriate brightness is not obtained by the shutter speed controller, the first controller sets a sensitivity which is in accordance with the brightness of the object detected by the brightness detector and which is lower than the predetermined sensitivity.

16. The image capture device according to claim 1, further comprising a diaphragm controller which controls a diaphragm device based on the brightness of the object detected by the brightness detector.

17. The image capture device according to claim 16, wherein the sensitivity obtaining unit obtains the sensitivity according to the object distance, the maximum amount of light emitted from the light source, and an aperture value of the diaphragm device which is controlled by the diaphragm controller.

18. The image capture device according to claim 1, further comprising a compressing unit which compresses the image signal amplified by the amplifier.

19. The image capture device according to claim 1, further comprising a storing unit which stores the image signal amplified by the amplifier in a memory.

20. The image capture device according to claim 19, further comprising a display which displays the image signal stored in memory by the storing unit.

21. A sensitivity setting method for an image capture device, wherein the image capture device comprises a light source which is caused to operate according to a brightness of an object and an amplifier which amplifies an image signal by an amplifying factor according to a set sensitivity, the method comprising:
detecting the brightness of the object;
obtaining an object distance to the object; and
selectively performing one of: (i) a first control which comprises disabling the light source, and setting the sensitivity in accordance with the brightness of the object and to be lower than a predetermined sensitivity, and (ii) a second control which comprises enabling the light source and setting the sensitivity to be lower than the predetermined sensitivity by obtaining a sensitivity according to the object distance and a maximum amount of light emitted from the light source, and setting the obtained sensitivity, wherein said image capture device is capable of performing both the first control and the second control.

22. An image capture device comprising:
light emitting means for emitting light;
image capture means for outputting an image signal;
detecting means for detecting a brightness of an object;

first control means for disabling the light emitting means and setting a sensitivity which is in accordance with the brightness of the object detected by the detecting means and which is lower than a predetermined sensitivity;

second control means for enabling the light emitting means and setting a sensitivity which is lower than the predetermined sensitivity;

means for amplifying the image signal output from the image capture means by an amplifying factor according to the sensitivity set by one of the first and second control means; and object distance obtaining means for obtaining an object distance to the object, wherein the second control means comprises:

sensitivity obtaining means for obtaining a sensitivity according to the object distance and a maximum amount of light emitted from the light emitting means; and a setting unit which sets the obtained sensitivity.

23. A sensitivity setting method for an image capture device, wherein the image capture device comprises light emitting means for emitting light, which is caused to operate according to a brightness of an object, and amplifying means for amplifying an image signal by an amplifying factor according to a set sensitivity, the method comprising:

detected the brightness of the object;

obtaining an object distance to the object; and selectively performing one of: (i) a first control which comprises disabling the light emitting means, and setting the sensitivity in accordance with the brightness of the object and to be lower than a predetermined sensitivity, and (ii) a second control which comprises enabling the light emitting means and setting the sensitivity to be lower than the predetermined sensitivity by obtaining a sensitivity according to the object distance and a maximum amount of light emitted from the light emitting means, and setting the obtained sensitivity, wherein said image capture device is capable of performing both the first control and the second control.

* * * * *